United States Patent
Pawelski et al.

(10) Patent No.: US 7,634,155 B2
(45) Date of Patent: Dec. 15, 2009

(54) HYBRID OPTICAL CYLINDER POSITION SENSOR

(75) Inventors: Paul C. Pawelski, Griffin, GA (US);
Francis J. Raab, Edwards, IL (US);
Trent S. Kucher, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 944 days.

(21) Appl. No.: 11/045,811

(22) Filed: Jan. 31, 2005

(65) Prior Publication Data

US 2006/0171568 A1    Aug. 3, 2006

(51) Int. Cl.
*G06K 9/00* (2006.01)
*G06K 9/36* (2006.01)

(52) U.S. Cl. .................. 382/291; 382/151; 382/152; 382/287

(58) Field of Classification Search .............. 382/107, 382/151, 152, 287, 291; 384/154; 348/155
See application file for complete search history.

(56) References Cited

U.S. PATENT DOCUMENTS 5,539,993 A * 7/1996 Kilpinen et al. .............. 33/706
5,951,475 A * 9/1999 Gueziec et al. .............. 600/425
6,556,946 B2   4/2003 Sewell
7,191,943 B2 * 3/2007 Sewell et al. ................ 235/454

OTHER PUBLICATIONS

G. Gordon et al., *Silicon Optical Navigation*, The Mechanical Computer Mouse, pp. 1-7, http://www.labs.agilent.com/news/2003features/Gordon_optical_nav.pdf.

* cited by examiner

*Primary Examiner*—John B Strege
(74) *Attorney, Agent, or Firm*—Finnegan, Henderson, Farabow, Garrett & Dunner

(57) ABSTRACT

Consistent with an aspect of the present disclosure, a method of locating a position of a movable member is provided. The movable member is movable along a path and has a surface with a plurality of markings provided thereon. The method includes sensing an image of a portion of the surface of the movable member, and calculating a position of the movable member based on the image. Further, the method includes determining whether the movable member is at a location corresponding to one of the plurality of markings, and eliminating an error associated with the position when the movable member is at the location corresponding to the one of the plurality of markings.

14 Claims, 13 Drawing Sheets

HYBRID OPTICAL CYLINDER POSITION SENSOR

TECHNICAL FIELD

The present disclosure is directed generally to a system and related method for determining a location of a movable member, and more particularly, to determining the linear position of a movable member.

BACKGROUND

Many construction and earthmoving machines use hydraulic or pneumatic cylinders for moving linkages and associated work tools, such as liftarms and buckets of a wheel loaders. The cylinder includes a rod coupled to the work tool or a linkage member, at one end, and a chamber at the other coupled to the machine or another linkage member. Hydraulic fluid is provided in the chamber to extend the rod along a linear path up to several meters in length. The fluid can also be removed from the chamber to retract the rod along the same path. Often the rod location or position along the linear path must be known so that movement of the work tool can be controlled.

Barcodes have been marked on cylinder rods in order to locate the position of the rod. In particular, the rod may be marked with a barcode including non-repeating segments of code, each of which correspond to a different location of the rod. In operation, a sensor is provided in the cylinder adjacent the barcode to identify a particular segment, which is then associated with a corresponding rod location.

U.S. Pat. No. 6,556,946 issued to Sewell on Apr. 29, 2003, describes a barcode utilizing a trinary code including a succession of data fields, each of which includes so-called "trits" or characters. Data is encoded by varying the relative amounts of black and white in each character. The barcode described in the Sewell patent facilitates accurate location measurements over a range of rod positions.

Barcodes are often marked on the rod by exposing several thousand regions along the entire length of the rod surface to intense laser light. The duration of exposure and the area exposed must be precisely controlled in order to generate a barcode that can be used to accurately locate the rod position. Marking barcodes in this manner, however, can be complicated and time consuming.

The present disclosure is directed to overcome one or more of the shortcomings in the prior art

SUMMARY OF THE INVENTION

Consistent with an aspect of the present disclosure, a method of locating a position of a movable member is provided. The movable member is movable along a path and has a surface with a plurality of markings provided thereon. The method includes sensing first and second images of a surface of the movable member, the first and second images corresponding to first and second portions, respectively, of the surface of the movable member. Further, the method includes calculating a position of the movable member based on the first and second images, and determining whether the movable member is at a location corresponding to one of the plurality of markings. The method also includes eliminating an error associated with the position when the movable member is at the location corresponding to the one of the plurality of markings.

In addition, a location monitoring system is provided which includes a movable member and a sensor circuit. The movable member is movable along a path, and has a surface. A plurality of markings are disposed on the surface of the movable member. The sensor circuit is configured to sense an image of a portion of the surface of the movable member, and has an associated viewing area. A width of the viewing area is less than a width associated with each of the plurality of markings.

Consistent with a further aspect of the present disclosure, a location monitoring system is provided which includes a movable member. The movable member is movable along a path, and has a surface with a plurality of markings disposed on the surface. Each of the plurality of markings has a uniform width, and each is uniformly spaced on the surface of the movable member. A sensor circuit is also provided which is configured to sense an image of a portion of the surface of the movable member, and generate a sense signal based on the image. In addition, a processor circuit is provided which is configured to determine a position of the movable member based on the sense signal.

Moreover, in accordance with an additional aspect of the present disclosure, a location monitoring system is provided which includes a movable member, a first sensor circuit, a second sensor circuit and a processor circuit. The movable member is movable along a path, and has a surface. First and second pluralities of markings are disposed on the surface of the movable member. The first sensor circuit is configured to sense a first image of a first portion of the surface including one of the first plurality of markings. The first sensor circuit also generates a first sense signal in response to the first image. The second sensor circuit is configured to sense a second image of a second portion of the surface including one of the second plurality of markings, and generate a second sense signal in response to the second image. The processor circuit is coupled to the first and second sensor circuits, and is configured to determine a position of the movable member based on the first and second sense signals.

In accordance with another aspect of the present disclosure, an apparatus is provided for forming a plurality of markings on a surface of a movable member. The apparatus includes a plurality of light sources spaced from one another by a uniform distance. The plurality of light sources are configured to simultaneously expose corresponding regions on the surface of the movable member, each of the regions corresponding to a respective one of the plurality of markings. The plurality of light sources are provided in the housing, which is configured to maintain each of the plurality of light sources at a uniform distance from the surface of the movable member.

In accordance with another aspect of the present disclosure, an apparatus is provided for forming a plurality of markings on a surface of a movable member. The apparatus includes a plurality of optical waveguides, respective end portions of which are spaced from the surface of the movable member by a uniform distance. In addition, the end portions are separated from one another by a uniform spacing. A light source and an optical switch are also provided. The optical switch is configured to selectively supply an output of the light source to each of the plurality of waveguides to thereby expose corresponding regions of the surface of the movable member. Each of the regions corresponds to a respective one of the plurality of markings.

In accordance with a further aspect of the present disclosure, a location monitoring system is provided that includes a movable member, a sensor circuit, and a processor circuit. The movable member is movable along a path, and has a surface with an associated roughness. The sensor circuit is configured to sense an image of a portion of the surface of the movable member and output roughness data associated with the surface. The processor circuit is coupled to the sensor circuit and is configured to receive the roughness data. The processor circuit is further configured to calculate a position of the movable member in response to the roughness data.

In accordance with an additional aspect of the present disclosure, a method is provided for locating a position of a movable member, which movable along a path and has a surface. The method includes sensing an image of a surface of the movable member, whereby the image corresponds to a portion of the surface of the movable member. The method also includes generating reflectivity data associated with the image, and determining a position of the movable member in response to the reflectivity data.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
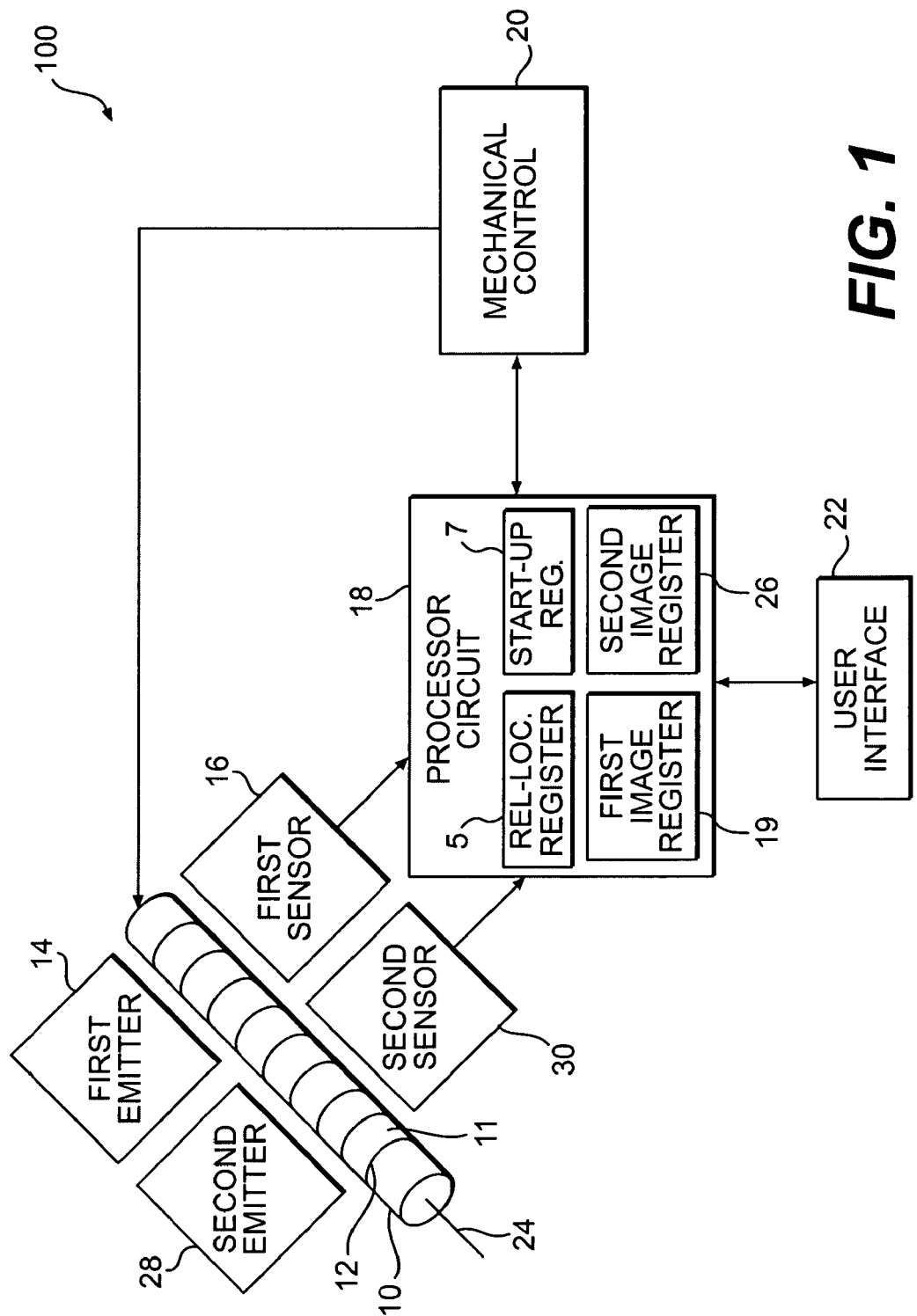
FIG. 1 illustrates a block diagram of a system for identifying a rod location consistent with an aspect of the present disclosure.

FIG. 1 illustrates a block diagram of system 100 for monitoring a position and controlling movement of movable member, object or rod 10. Rod 10 typically includes a conventional chromium outer surface 11 and a longitudinal axis 24. Surface 11 may also be thermally sprayed. A plurality of markings 12 or reference markings are provided on outer surface 11, typically with a high intensity laser (e.g. an NdYAG laser) that selectively exposes portions of surface 11. Markings 12 can be uniformly spaced, or the distance between each may vary. In addition, markings 12 typically may have a uniform width. A first emitter 14 is optionally provided for illuminating a portion of surface 11, and a first sensor circuit 16 senses an image of the portion of the surface 11. A viewing area associated with sensor circuit 16 typically has a width less than that of a width associated with each of markings 12.

Additional markings, such as barcode markings typically having widths less than that of the viewing area, as well as markings 12, can also be provided on surface 11, as discussed in greater detail below with respect to FIG. 11. When such additional markings are present on surface 11, a second emitter 28 and second sensor circuit 30 may be included. Second emitter 28 may include one or more light emitting diodes, which expose a further portion of the outer surface 11 including the additional markings to light typically at optical frequencies, although other frequencies of electromagnetic radiation may be used that permit accurate sensing of surface 11. Light is reflected off or emanates from the exposed portion of outer surface 11 and an image of the further portion of surface 11 is sensed by second sensor circuit 30, which may include a known linear optical sensor such as a linear optical senor commercially available from Texas Instruments, Inc.

Markings 12 and any additional markings may also be provided on an internal surface of rod 10, and exposed from within. In that case, the rod may be transparent, and photosensors provided external to the rod would sense light passing through a portion of the internal surface of the rod instead of being reflected from it. The markings may also be observed from inside such a rod. In addition, rod 10 may be exposed with ambient light, if such light is of sufficient intensity. In that case, first and second emitters 14 and 28 may not be required.

In response to the sensed images, first (16) and second (30) sensor circuits generate and supply first and second sense signals, respectively, to a processor circuit 18, which may be a conventional microprocessor, computer, or digital signal processor and associated circuitry. Processor circuit 18, in turn, determines a position of rod 10 and information concerning the position is optionally displayed on a user interface device 22 including, for example, a display or monitor. Typically, the determined position of rod 10 is relative to a previous position of the rod. Accordingly, processor circuit 18 often obtains a relative position of rod 10.

A keyboard or other data entry device may also be provided, and in response to commands input to the processor circuit 18 and the identified position, processor circuit 18 supplies control signals to mechanical control circuit 20, to thereby move or change the location of rod 10. Processor circuit 18 may include any appropriate analog or digital circuitry, such as a digital signal processor, even if such circuitry is physically housed in the first (16) and/or second (30) sensor circuits.

Figure 11:
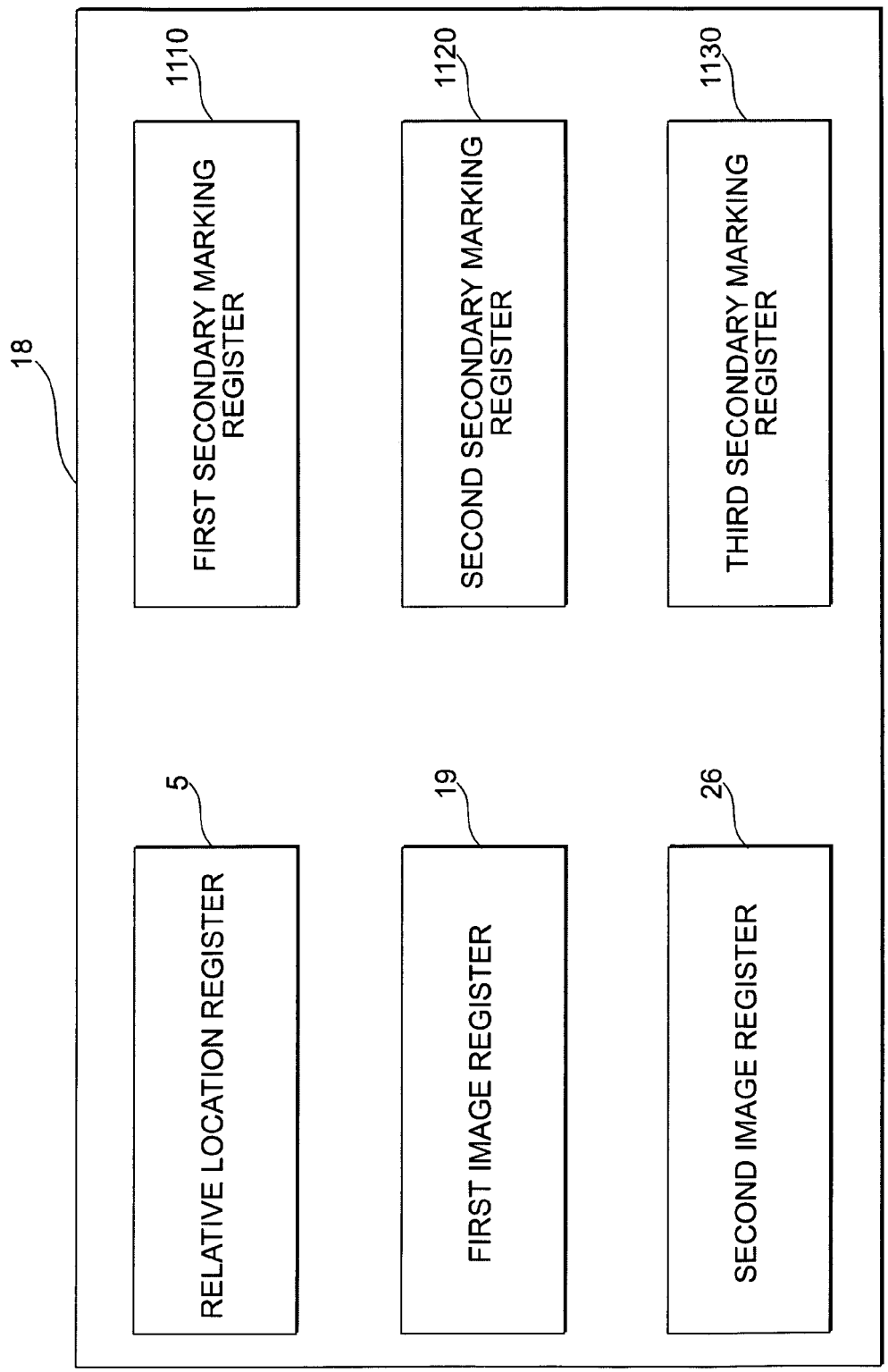
FIG. 11 illustrates a block diagram of a processor circuit consistent with an aspect of the disclosure.

As shown in FIGS. 1 and 11, processor circuit 18 includes multiple memories or registers: relative location register 5, start-up register 7, first image register 19, and second image register 26. As further shown in FIG. 11, processor circuit 18 can also include first (1110), second (1120), and third (1130) secondary marking registers. Each of these registers store position related data, and include computer readable media, and will be discussed in greater detail below.

The term "computer-readable medium" as used herein refers to any medium or combination of media that participates in providing instructions to or stores data for processor circuit 18. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics, and can also take the form of acoustic or light waves, such as those generated during radio-wave and infra-red data communications. Common forms of computer-readable media include, for example, a register, floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer or processor circuit 18 can read.

Figure 6:
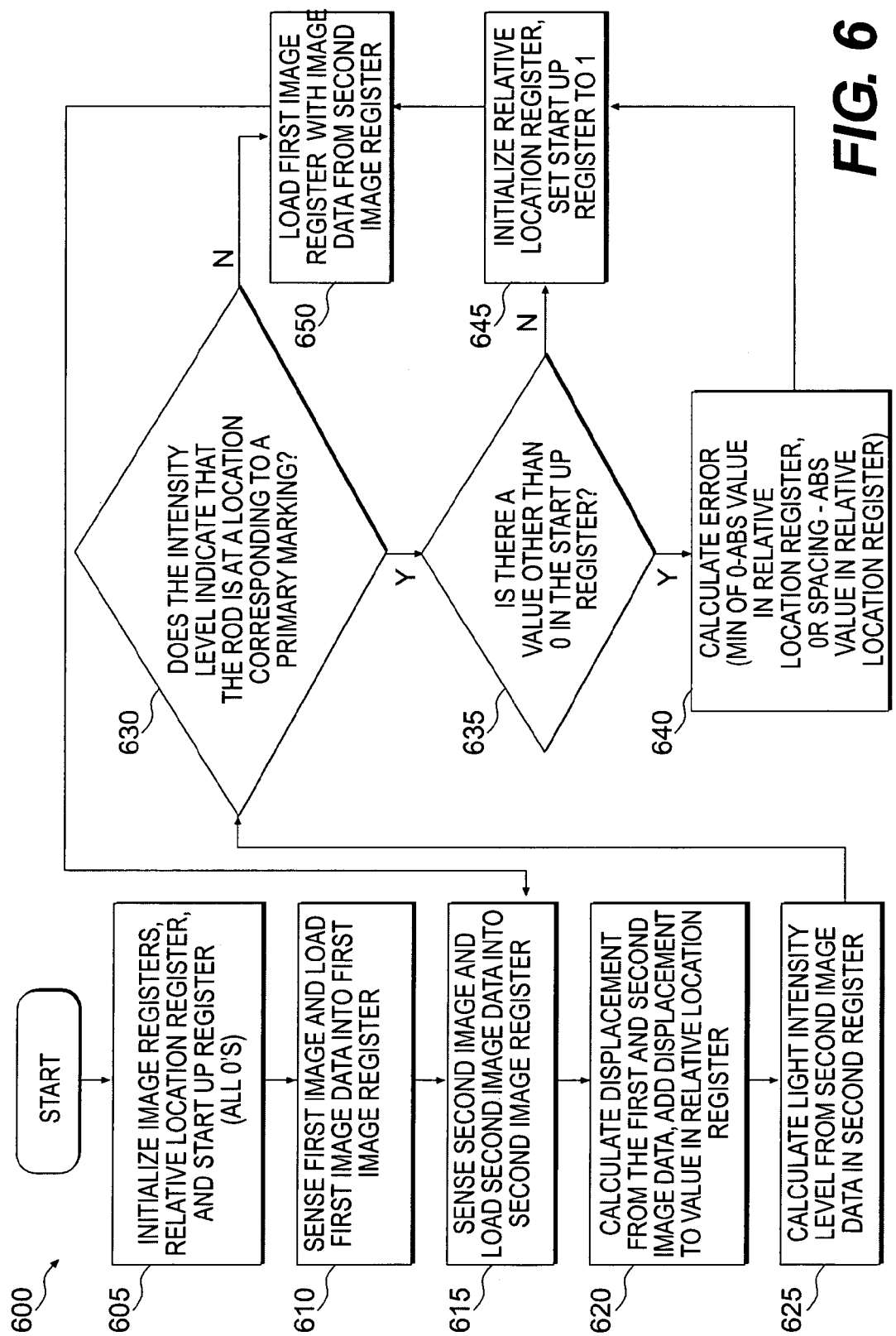
FIG. 6 illustrates a flowchart of a method for locating a position of a rod consistent with an additional aspect of the present disclosure.
Figure 13:
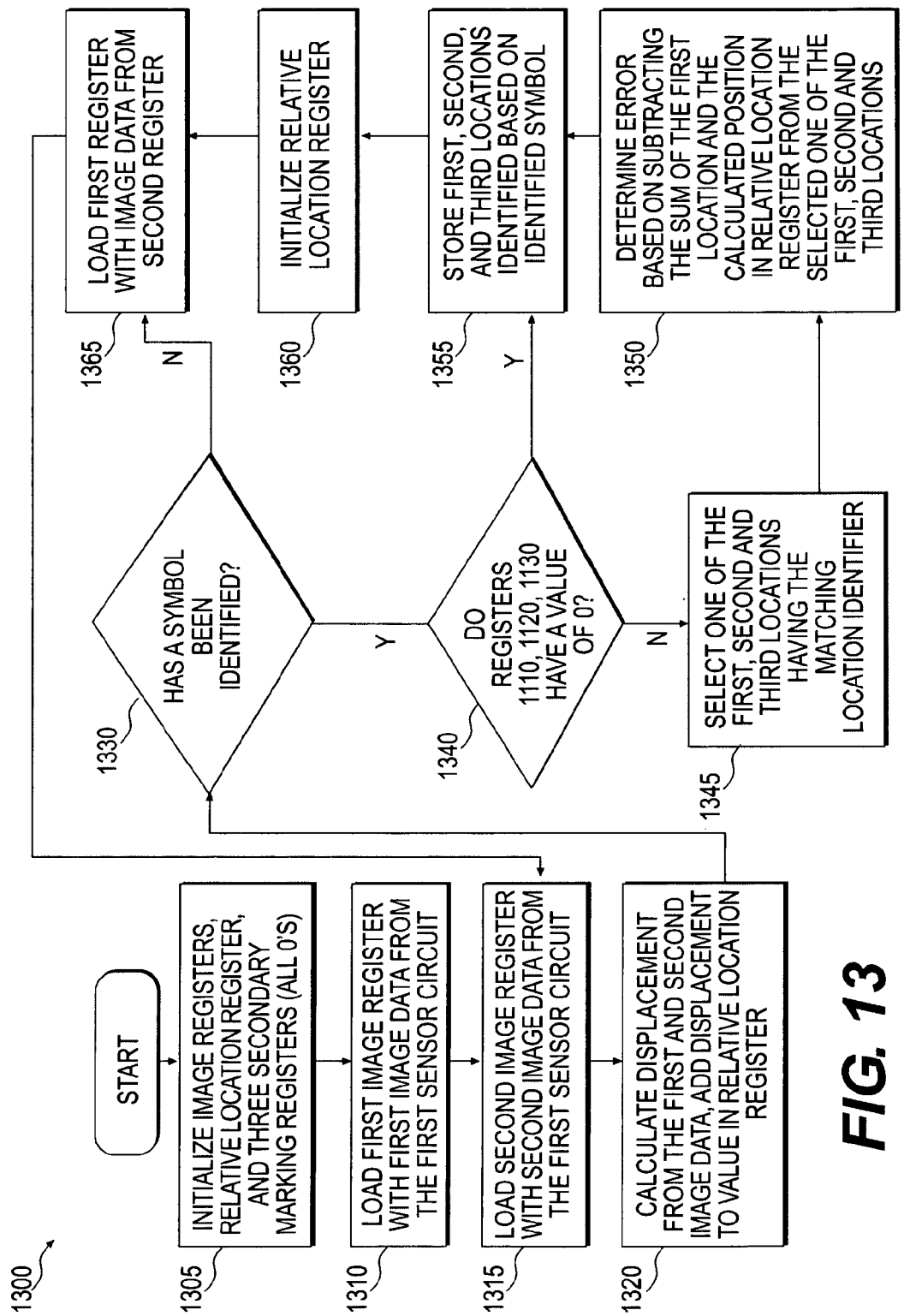
FIG. 13 illustrates a flowchart of a method for locating a positon of a rod consistent with another aspect of the disclosure.

Consistent with an aspect of the disclosure, processor circuit 18 executes instructions for carrying out or performing a method of identifying a relative position or location of rod 10, such as the method described below in connection with FIGS. 6, 8 and 13. Such instructions may be read into a computer readable medium, such as a memory incorporated into or provided external to processor circuit 18. In alternative embodiments, hard-wired circuitry may be used in place of or in combination with software instructions. Thus, embodiments of the invention are not limited to any specific combination of hardware circuitry and software.

Figure 2:
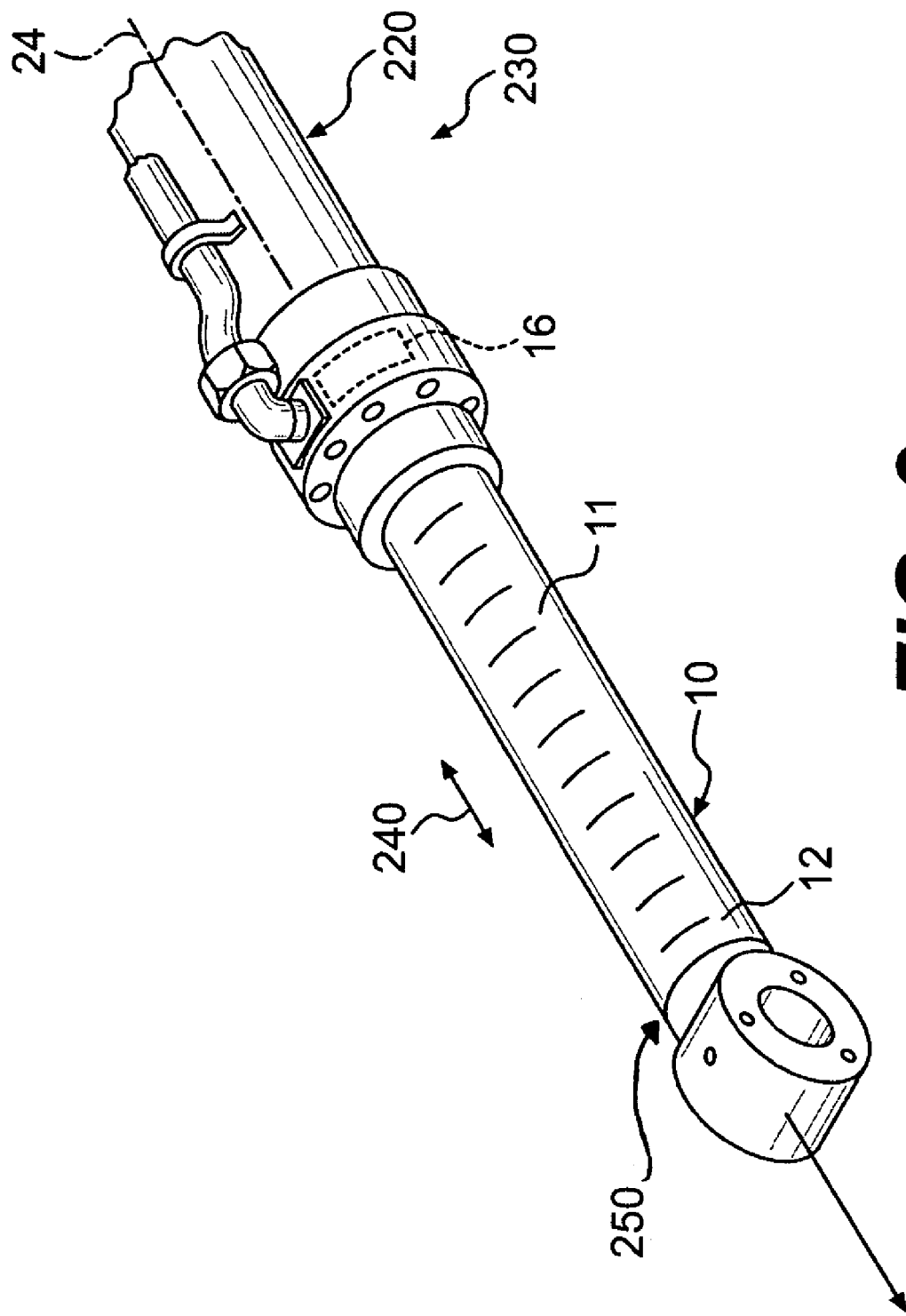
FIG. 2 illustrates a perspective view of a portion of the system shown in FIG. 1.

FIG. 2 illustrates rod 10 disposed in a cylinder body 220. Collectively, rod 10 and cylinder body 220 constitute a cylinder 230, which can be any one of a wide variety of hydraulic, pneumatic and similarly actuated cylinders. Cylinder 230 is operable to extend rod 10 from, and retract rod 10 into, cylinder body 220 typically along a linear path of movement represented by arrow 240. Path 240 typically extends axially with respect to a longitudinal axis 24. Optionally, senor circuit 16 may be provided in cylinder body 220.

In the embodiment shown in FIG. 2, rod 10 is movable while cylinder body 220 is stationary. The present disclosure, however, is applicable to other rod and cylinder body configurations whereby the rod is stationary and the cylinder body is movable, as well as configurations in which both the rod and cylinder body are movable. As used herein, the term "movable" refers to actual movement of the rod, member or object, as well as relative movement in configurations in which the rod, member or object is stationary but the reader circuit is movable, and configurations in which both the rod, member or object and the reader circuit are movable.

Markings 12 may include endpoints respectively provided adjacent corresponding ends of rod 10. For example, marking endpoint 250 is provided adjacent one end of rod 10, and another marking endpoint is located within cylinder body 220 adjacent the other end of rod 10, which, in the position shown in FIG. 2, is adjacent sensor circuit 16. First sensor circuit 16 may be provided in cylinder body 220, as shown in FIG. 2. Second sensor circuit 30 may also be included in cylinder body 220.

Figure 3:
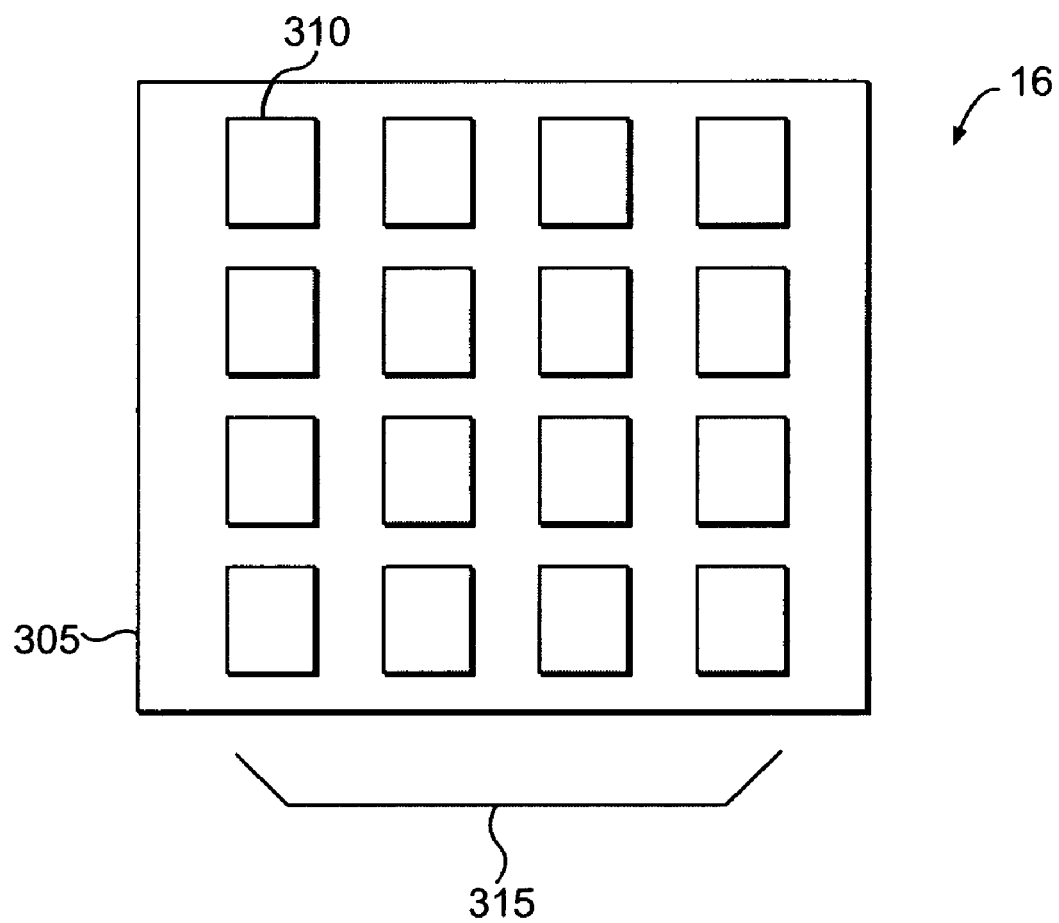
FIG. 3 illustrates is a portion of a sensor circuit consistent with an aspect of the present disclosure.

FIG. 3 illustrates a portion of first sensor circuit 16 in greater detail. First sensor circuit 16 typically includes an array 305 of detectors 310. Detectors 310 may include, for example, photodiodes or other semiconductor photoresponsive devices integrated on a substrate. Typically, array 305 is two-dimensional so that detectors 310 are arranged in both horizontal and vertical directions in FIG. 3. As further shown in FIG. 3, first sensor circuit 16 has a viewing area 315 having a width that substantially extends along a width of array 305. First sensor circuit 16 may include an optical mouse sensor chip, such as model ADNS-2051, commercially available from Agilent Technologies, Inc., having an array of 16×16 photodetectors and a digital signal processor (DSP).

Although detectors 310 are shown spaced from one another, it is understood that the detectors may also be concatenated.

First sensor circuit 16 is configured to output reflectivity data, for example to processor circuit 18. The reflectivity data typically differs for each successively sensed image of surface 11. Thus, based on the reflectivity data, processor 18 can calculate a relative position of rod 10, for example, as discussed below with reference to FIG. 4, which illustrates an example in which the reflectivity data includes roughness data associated with surface 11.

Figure 4:
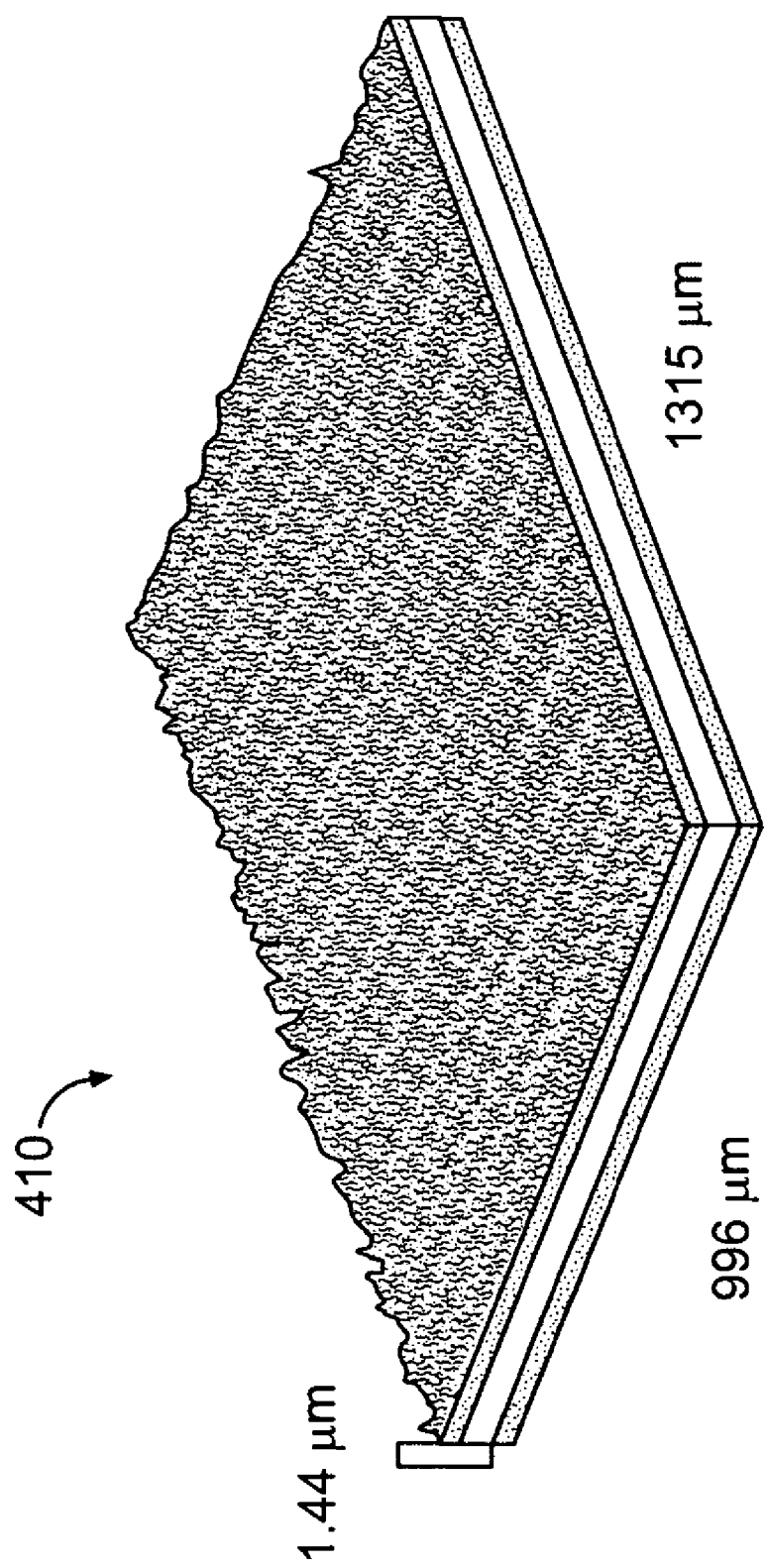
FIG. 4 illustrates a detailed view of a portion of a surface of a rod.

In particular, FIG. 4 illustrates an enlarged view of a portion 410 of surface 11. Portion 410, which in this example is 996 μm×1315 μm, has a particular reflectivity associated with surface roughness or irregularities which typically do not exceed 1.44 μm. Such surface roughness scatters light impinging on surface 11 thereby creating an image on first sensor circuit 16 which is bright in some portions, but dark in others The image changes as rod 10 moves past first sensor circuit 16. By identifying the same surface feature in two consecutive images and measuring its relative displacement between the two frames, rod displacement can be measured. First sensor circuit 16 can be configured to sense 23,000 such images per second and supply roughness data associated with these images to processor circuit 18. The DSP in first sensor circuit 16 can calculate a relative position of rod 10 based on reflectivity or roughness data of these images in a known manner, and can also generate image quality data, such as received light intensity information. Processor circuit 18 receives the roughness data associated with the images and calculates a position or location of rod 10 in response to the roughness data. As noted above, the term "processor circuit," as used herein, includes digital and/or analog circuitry, even if such circuitry is provided in separate housings or packages. Thus, the DSP in first sensor circuit 16 can be considered part of processor circuit 18.

Processor circuit 18, however, is often unable to distinguish between adjacent images, if, for example, two adjacent portions of surface 11 have similar surface features. In that case, processor circuit 18 may determine that rod 10 has not moved at all, even though it has, in fact, moved, or processor circuit 18 may estimate the position of rod 10 based on previous images. In either instance, the position calculated by processor circuit 18 may include an error. The error is typically small, but after repeated calculations, can accumulate and be substantial.

Figure 5:
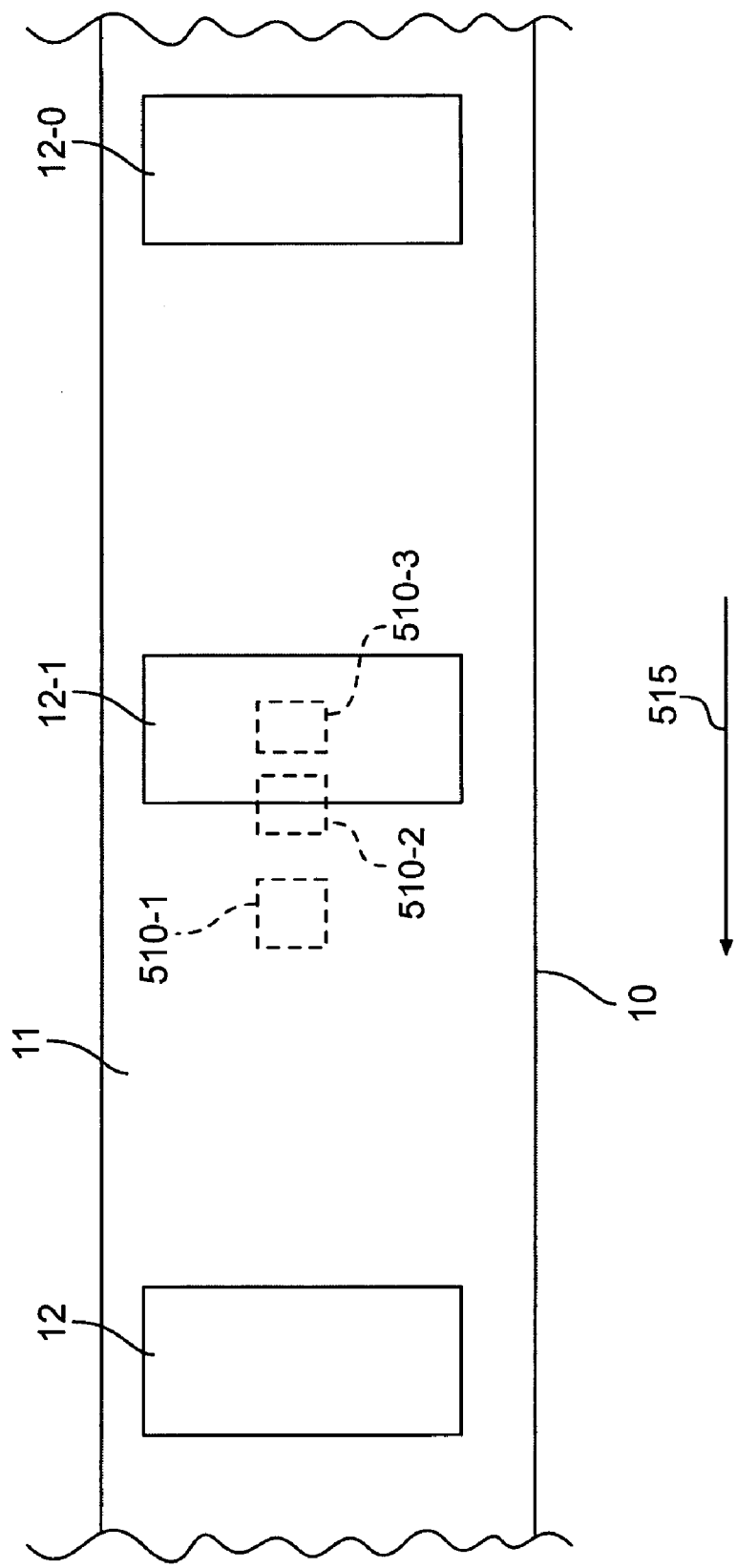
FIG. 5 illustrates a portion of a surface of a rod consistent with an additional aspect of the present disclosure.

Consistent with an aspect of the disclosure, elimination of the accumulated error will next be described with reference to FIGS. 5 and 6. FIG. 5 illustrates rod 10 moving in a direction indicated by arrow 515. Initially, viewing area 315 is positioned over a portion 510-1 of surface 11 shown in phantom in FIG. 5. As rod 10 continues to move to the left in FIG. 5, viewing area 315 is located over a different portion 510-2 of surface 11. Region or portion 510-2, however, overlaps one of the markings 12, e.g. 12-1. Markings 12 may be formed by laser annealing surface 11, and thus, the reflectivity of markings 12 is typically less than that of the surrounding portions of surface 11. As a result, the amount of light or the intensity of light received by first sensor circuit 16 when viewing area 315 is over portion 510-2 is less than when viewing area 315 was positioned over region or portion 510-1. As noted above, processor circuit 18 is configured to sense the quality of the sensed images, and can generate signals indicative of the intensity of the light received by detectors 310.

When rod 10 is at a location corresponding to substantially the middle or center of marking 12-1, viewing area 315 is over a portion 510-3 of surface 11. The sensed intensity is typically at a minimum at this location, but surface 11 can be processed such that the level of light reflected is a maximum. In the example shown in FIG. 5, the width of viewing area 315 is less than that of markings 12. It should be understood, however, that the width of viewing area 315 can be substantially the same as that of markings 12.

The minimum (or maximum, as the case may be) intensity value is passed to processor circuit 18, and based on this data, processor circuit 16, eliminates the accumulated error and resets the location relative of rod 10 to zero. As rod 10 continues to move toward the left and first sensor circuit 16 moves farther away from marking 12-1, processor circuit 18 calculates a position of the rod 10 in a manner similar to that discussed above, but the position is relative to marking 12-1, i.e., the last sensed marking. When first sensor circuit 16 encounters the next one of markings 12, e.g., marking 12-0, the above process is repeated to eliminate accumulated error, and again resets the relative location of rod 10 to zero. Subsequent position calculations are made relative to that marking. Elimination of accumulated error will next be discussed in greater detail below with reference to FIG. 1 and flowchart 600 shown in FIG. 6.

As noted above with respect to FIG. 1, processor circuit 18 includes multiple memories, which are typically registers that temporarily store data in a known manner. First (19) and second (26) image registers store data associated with current and previous images of surface 11 sensed by first sensor circuit 16. Relative location register 5 stores a current calculated location of rod 10. The calculated location is typically relative to the last detected marking 12, as noted above.

Returning to FIG. 6, in step 605, the location of the rod 10 is initialized by setting the values of the contents stored in the image (19, 26) and relative location (5) registers to a predetermined value, such as zero. Such initialization occurs at initial startup and, as noted above, when the viewing area is centered within one of markings 12, and thus provides a reference location of rod 10 independent of the calculated position. At initial start up, start up register 7 is also set to zero. First sensor circuit 16 then senses a first image of a portion of surface 11 of rod 10 (step 610), and then a second image of a second portion of the surface 11 or the rod 10 (step 615). This second portion typically partially overlaps the first position. Image or roughness data associated with the first and second images is added to the value in relative location register 5. In step 625, the average light level of the most recent image is detected based on, for example, the image data associated with the second image stored in second image register 26. Next, in step 630, a determination is made based on that light level as to whether rod 10 is at a location corresponding to one of the plurality of markings 12. If a minimum (or maximum, as the case may be) intensity level, which would indicate that first sensor circuit 16 is above, and typically substantially centered over, one of markings 12 is not identified, then in step 650, the image data stored in the second register 26 (i.e., the most recent image data) is shifted to the first image register 19, and steps 615 through 635 are repeated. When a minimum intensity level, for example, is detected, the viewing area of first sensor circuit 16 is centered within one of the markings 12, and the position of rod 10 can be assumed to be the same as the marking location. When this happens, processor 18 checks start up register 7 to determine whether this is the first time that a marking 12 has been identified since start up (step 635). If it is, then in step 645 start up register is set to one and the relative location register is reset or reinitialized to zero.

Next, in step 650 the most recent image is shifted from the second image register 26 to the first image register 19, and steps 615 through 635 are repeated. If this is not the first marking 12 that was located by processor circuit 18, first sensor circuit 16 may be assumed to be over one of three markings 12. In particular, sensor circuit 16 may be over the same marking 12 it was over when relative location register 5 was last initialized (to zero, for example), or it may be over the next closest marking 12 in either direction from marking 12 where the relative location register was last initialized. In step 640 the amount of error in the relative location register is calculated. The error is the minimum of one of two distance values. The first distance value is equal to the calculated position stored in relative location register 5, and the second distance value is equal to the distance between markings 12 minus the absolute value in the relative location register 5. The first distance value will be the minimum of the two, and thus equal the error, when sensor 16 is centered at the same one of the markings 12 as it was previously. If rod 10 moves to an adjacent marking, however, the second distance value will be less than the first, and the error will be set to the second distance value.

In step 645, start up register 7 is set to one and the relative location register is reinitialized to zero. Next, in step 650, the most recent image is shifted from second image register 26 to first image register 19, and steps 615 through 635 are repeated.

The calculated error may be used by processor circuit 18 to further control movement of rod 10.

Figure 7:
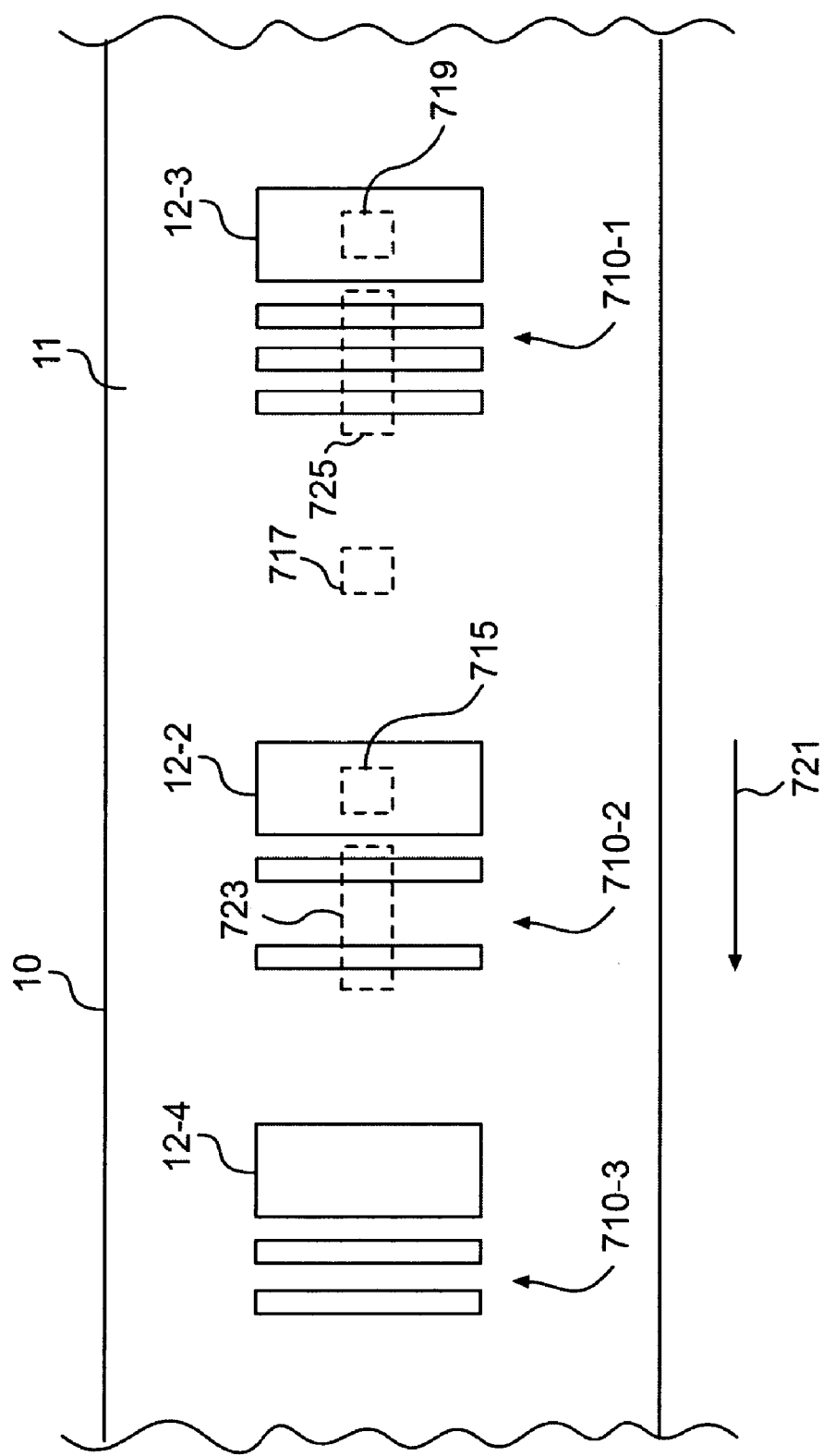
FIG. 7 illustrates a portion of a surface of a rod consistent with a further aspect of the disclosure.

In the embodiment discussed above, uniformly spaced markings 12 are provided on surface 11. When rod 10 is between such markings, error can accumulate in the calculated position. As noted above, however, the error is typically not eliminated until rod 10 is positioned at a location corresponding to one of markings 12. Often, more precise rod positions are required at certain rod locations, e.g., near an end point 250, than others. Thus, consistent with a further aspect of the disclosure, non-uniformly spaced markings 12 (with reference to FIGS. 7, and 8, "first" or "primary" markings 12) may be provided such that the markings are spaced closer together in certain regions of surface 11 where more precision is required, and spaced farther apart in other regions where less precision is sufficient. According to this further aspect of the disclosure, a plurality of second or secondary markings (710-1 to 710-3, for example, as shown in FIG. 7) may provided adjacent primary markings 12 to identify the location of each of markings 12 along the length of the rod. The secondary markings typically have widths less than the primary markings 12. Once the location of a primary marking 12 is known, the distance value can be determined, and the accumulated error eliminated in a manner similar to that discussed above. Secondary markings may be grouped into barcodes, for example, near each of the primary marking along the length of rod 10. Processor circuit 18 typically stores location identifiers and locations associated with each such second marking.

Turning to FIG. 7, secondary markings are shown as barcodes 710-1 to 710-3 on surface 11 of rod 10, although other markings, such as alpha-numeric markings and two-dimensional barcodes may also be used. Assuming that viewing area 315 is positioned over portion 715 of surface 11 and is centered within primary marking 12-2, for example, the contents of registers 5, 19, 26, 1110, 1120 and 1130 (see FIG. 11 and further discussion below) are initialized and set to zero or another predetermined value in a manner similar to that described above. In addition, processor circuit 18 activates, in this embodiment, second sensor circuit 30, to sense a portion 723 of surface 11 corresponding to the viewing range of second sensor 30, thereby obtaining an image of secondary marking 710-2. The image corresponds to a location identifier and associated rod location stored in processor circuit 18. Processor circuit 18 also looks up or identifies the locations of the closest two primary markings, which in this example, are markings 12-3 and 12-4. The location identifiers and corresponding rod locations of markings 12-2, 12-3, and 12-4 are temporarily stored in a separate memory for ready access by processor circuit 18. As rod 10 moves to the left in FIG. 7 in the direction indicated by arrow 721, viewing area 315 of first sensor circuit 16 senses an image of portion 717 of surface 11, for example, between markings 12-2 and 12-3. Processor circuit 18 calculates a position of rod 10 based on the sensed image of portion 717, in a manner similar to that discussed above. Other images can be sensed by first sensor circuit 16 as rod 10 continues to move in direction 721, including images of secondary marking 710-1, for example. Secondary markings 710-1 to 710-3 have widths less than those of primary markings 12. Thus, when sensed by first sensor circuit 16, such images are treated as other images of surface 11, and are typically not used to look up the rod location.

When viewing range 315 is centered over primary marking 12-3, including portion 719 of surface 11, and a minimum (or maximum) intensity is detected by first sensor circuit 16, sensor circuit 30 is activated again to sense an additional portion 725 of surface 11, corresponding to the viewing range of second sensor circuit 30, to obtain an image of secondary marking 710-1. The corresponding location identifier of secondary marking 710-1 is thus obtained by processor 18, and then compared with the three location identifiers stored previously to readily obtain or select the location of rod 10 associated with secondary marking corresponding to marking 12-3. Thus, the location of marking 12-3 can be determined without comparing the sensed identifier with each and every identifier stored in processor 18. A difference between the location and the relative position of rod 10 is determined in order to obtain the accumulated error. The accumulated error is then eliminated.

A method for identifying a position of rod 10 having secondary markings will next be described in greater detail with reference to flowchart 800 shown in FIG. 8. In step 805, the location of the rod 10 is initialized by setting the values of the contents stored in the image (19, 26) and relative location (5) registers, as well as secondary marking registers 1110, 1120, and 1130, to a predetermined value, such as zero. First sensor circuit 16 then senses a first image of a first portion of surface 11 of rod 10 and processor 18 loads corresponding first image data into the first image register 19 (step 810). A second image of a second portion of surface 11 is then sensed and associated second image data is stored in second image register 26 (step 815). Typically, this second portion partially overlaps the first position, and the position (e.g., a relative position) of rod 10 is calculated by processor circuit 18 (step 820), as noted above, and added to the value in the relative location register 5.—As in steps 625 and 630 above, the average light level of the most recent image (corresponding to the second image data stored in second image register 26) is calculated, and in step 830, a determination is made based on that light level as to whether rod 10 is at a location corresponding to one of the plurality of markings 12. If a minimum intensity level, for example, is not identified, then in step 865 the most recent image is shifted from the second image register 26 to the first image register 19, and steps 815 through 830 are repeated.

When a minimum intensity level is detected (step 830), the viewing area of first sensor 16 is centered within one of the markings 12, e.g., marking 12-2, and the second sensor 30 is activated to read a secondary marking, such as barcode 710-2 (step 835) in the example shown in FIG. 7. At this point, a determination is made whether each of secondary marking registers 1110, 1120, and 1130 store all zero values (step 840), which is typically the case at start up as a result of initialization step 805.

If each of registers 1110, 1120, and 1130 store all zero values, the location of the primary marking associated with the secondary marking sensed in step 835 and a corresponding location identifier are stored in the second secondary marking register 1120 (e.g., the location and identifier associated with marking 12-2). Processor circuit 18 also looks up adjacent locations associated with markings 12-3 and 12-4 for example, on either side of marking 12-2, and stores these locations (and their corresponding location identifiers) in first (1110) and third (1130) secondary registers, respectively (step 855). The relative location of rod 10 stored in register 5 is reinitialized in step 860, and in step 865, the image data stored in second image register 26 is loaded into first image register 19. Steps 815-830 are then repeated.

If a determination is made in step 840 that secondary marking registers (1110, 1120, 1130) do not store all zero values, the primary marking location associated with the identifier of secondary marking 710-1 (assuming rod 10 has moved such that viewing area 315 is over portion 719 and centered within primary marking 12-3) is compared to the secondary marking identifiers stored in registers 1110, 1120, and 1130. One of the first, second and third locations having the matching secondary marking identifier is then selected (step 845). In this instance, the identifier associated with barcode 710-1 and corresponding location of primary marking 12-3 will match the identifier stored in third secondary marking register 1130. Thus, processor circuit 18 can identify the position of rod 10 as corresponding to the location of primary marking 12-3 by readily associating the matching identifier with the corresponding rod location.

It is noted that the three locations stored in registers 1110, 1120, and 1130 are typically the only three primary marking locations that rod 10 could move to. Accordingly, by storing the locations and corresponding identifiers in registers 1110, 1120, and 1130, processor circuit 18 need not compare the identified secondary marking identifier to all possible secondary marking identifiers to determine the corresponding primary marking location.

Next, the sum of the first location (e.g., the location of primary marking 12-2) plus the calculated relative position stored in relative location register 5 is subtracted from the selected location in step 845 (e.g., the location of primary marking 12-3) to obtain the error (step 850). At this point, secondary marking register 1120 stores the current primary marking location (i.e., the location of marking 12-3) as well as the primary marking locations on either side of primary marking 12-3 in registers 1110 and 1130, respectively (step 855). In addition, the relative location register 5 is reinitialized (step 860) to eliminate this error, and the most recent image data from the first sensor 16 is shifted into the first image register 19 (step 865). The above process is then repeated starting at step 815.

Figure 8:
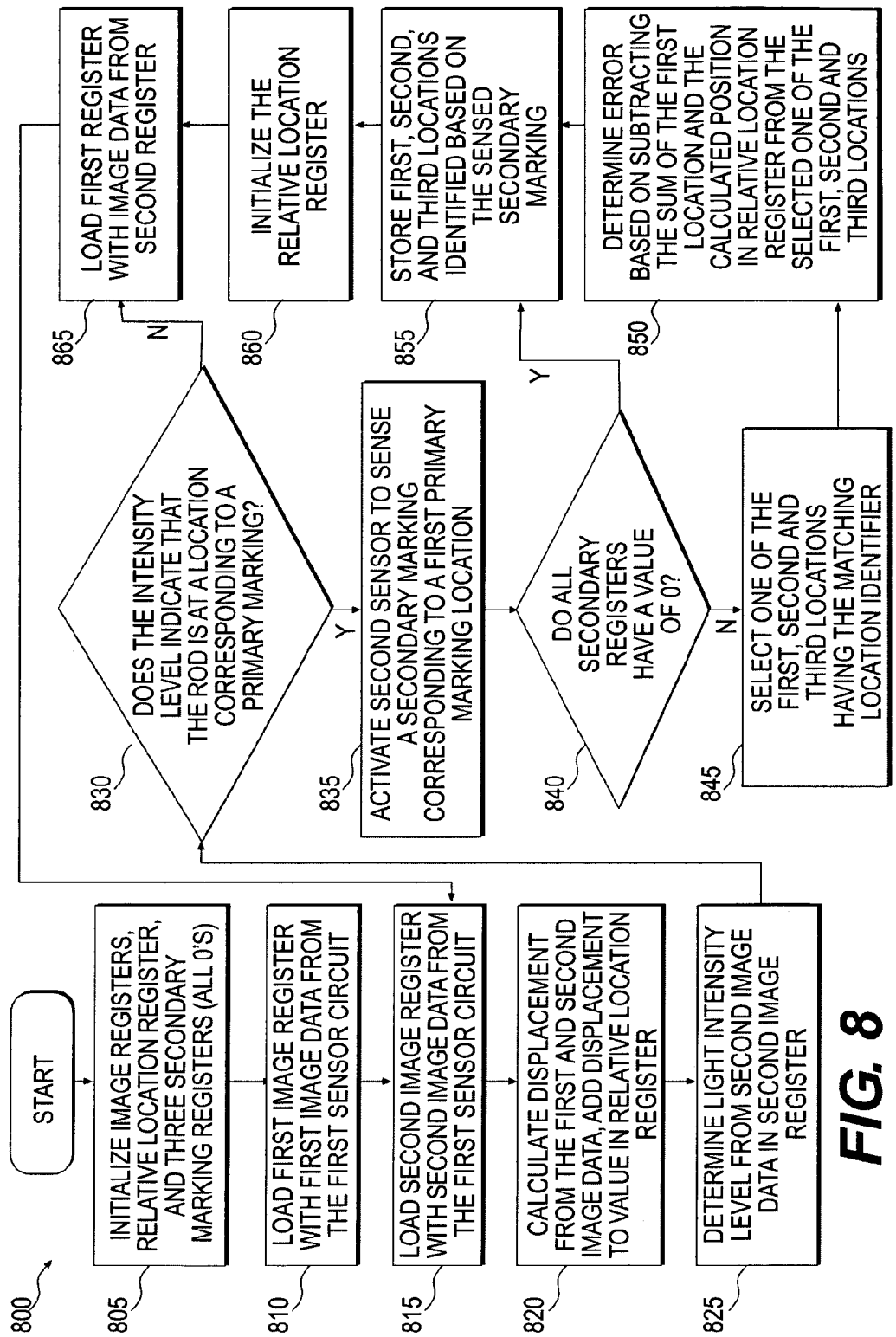
FIG. 8 illustrates a flowchart of a method for locating a position of a rod consistent with an additional aspect of the disclosure.
Figure 9:
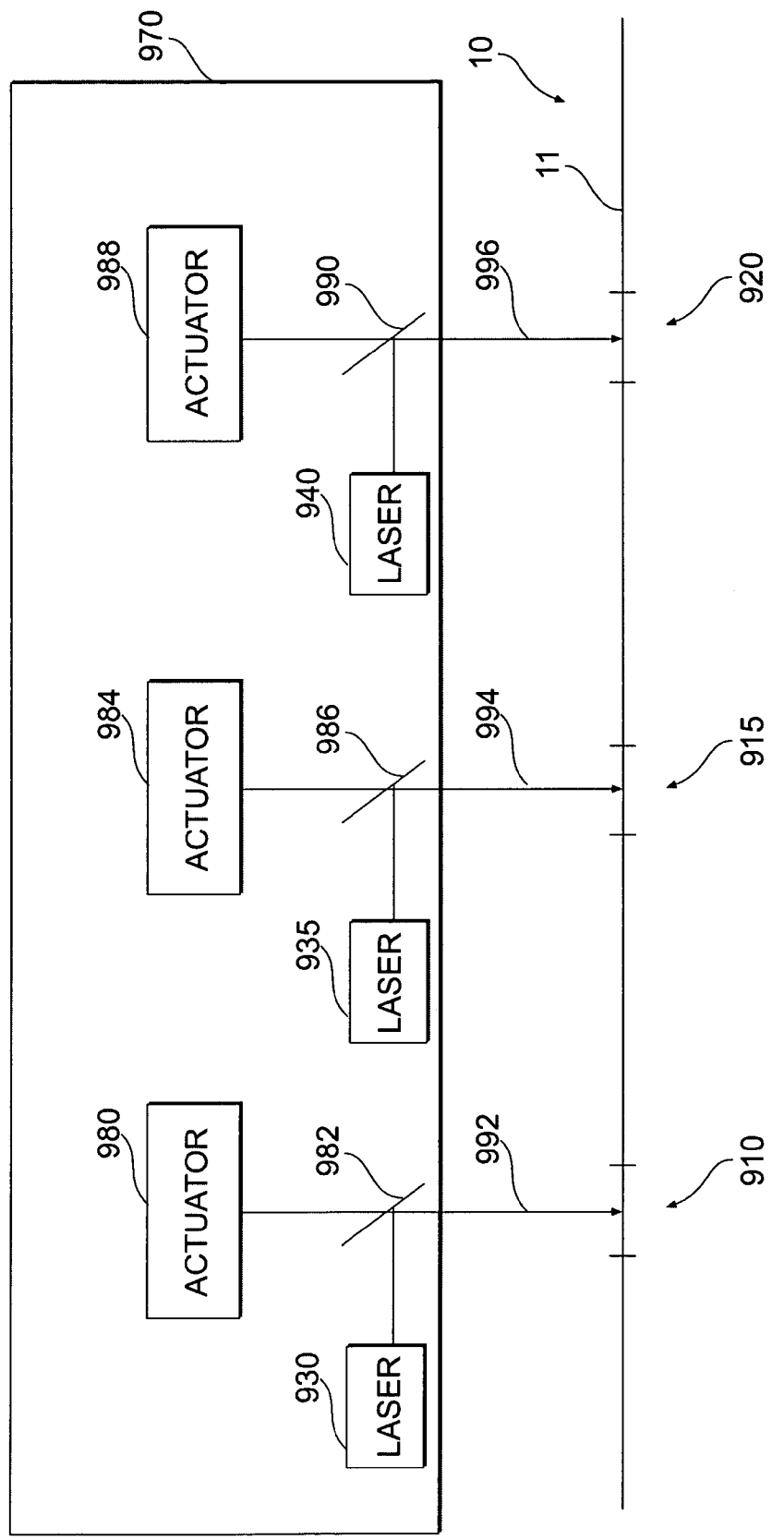
FIG. 9 illustrates an apparatus for generating markings on a rod consistent with an aspect of the present disclosure.
Figure 12:
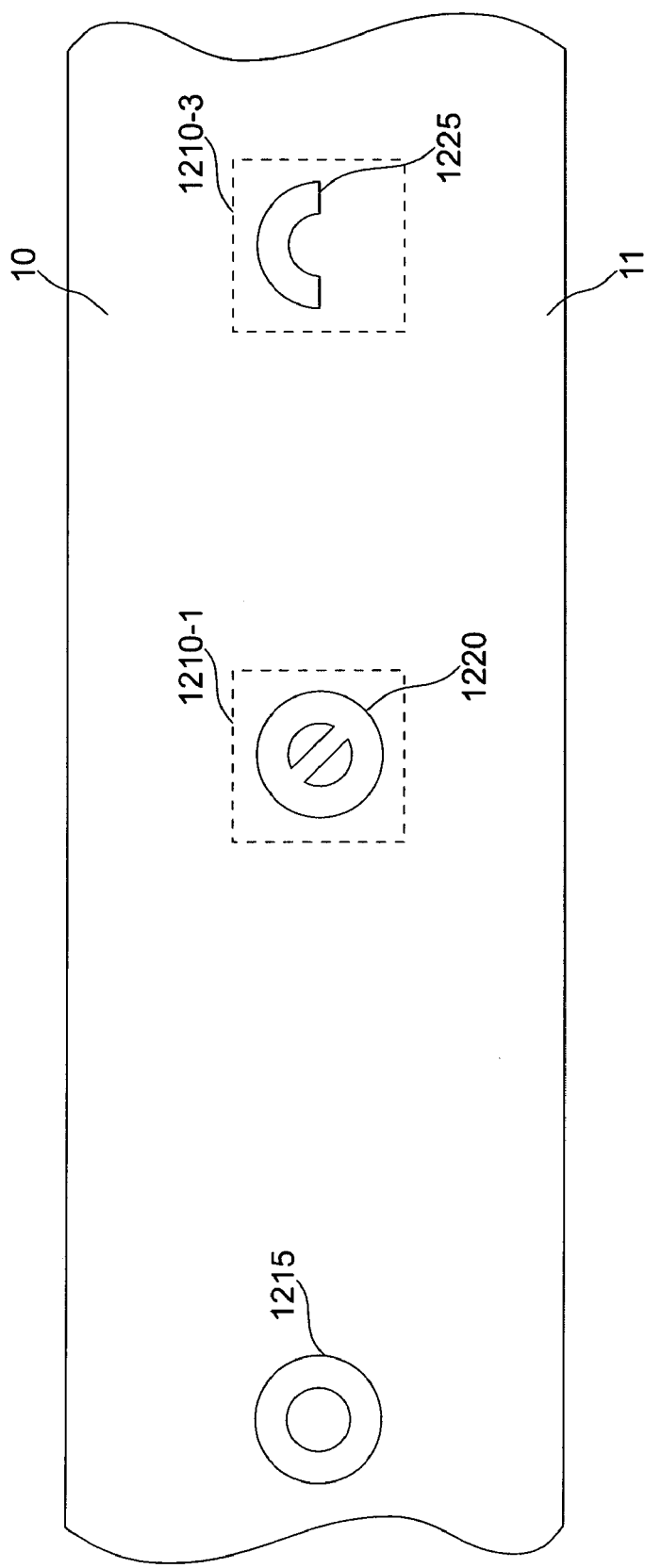
FIG. 12 illustrates a portion of a surface of a rod consistent with an additional aspect of the disclosure.

In the embodiment discussed in above in connection with FIGS. 7-9, two sensor circuits (first sensor circuit 16 and second sensor circuit 30) detect primary (12) and secondary (710-1 to 710-3) markings, respectively, when the distance between primary markings 12 is non-uniform. Consistent with a further aspect of the present disclosure, however, a single sensor, such as first sensor circuit 16, may be provided to sense a series of non-uniformly spaced markings without second sensor circuit 30. For example, as shown in FIG. 12, markings, such as symbols 1215, 1220, and 1225 may be provided on surface 11 of rod 10. In this example, each symbol represents a particular location of rod 10, and can include any pattern recognizable by first sensor circuit 16, such as a one or two dimensional barcode, or an alpha-numeric character. A symbol is recognized when viewing area 315 is over a portion of surface 11 covering that symbol. For example, when viewing area 315 is over portion 1210-1, symbol 1220 may be sensed by first sensor circuit 16, and recognized by processor circuit 18. In addition, when viewing area 315 is over portion 1210-3 symbol 1225 can be recognized by processor circuit 18. In the example shown in FIG. 12, symbols 1215, 1220, and 1225 are circular and semi-circular shapes.

A method for identifying a position of rod 10 having variably spaced symbols will next be described in greater detail with reference to flowchart 1300 shown in FIG. 13. Various steps in flowchart 1300 are similar to those discussed above in regard to FIG. 8. For example, preliminary steps 1305, 1310, 1315 and 1320 are similar to steps 805, 810, 815, and 820, respectively. In step 1330, however, unlike step 830, a determination is made as to whether a symbol has been identified by first sensor circuit 16 (e.g., when viewing area 315 is over portion 1210-3 covering symbol 1220). A determination is then made whether each of registers 1110, 1120, and 1130 store all zero values (step 1340), which is typically the case at start up as a result of initialization step 1305.

If each of registers 1110, 1120, and 1130 store all zero values, the location of the sensed symbol (e.g., symbol 1220) and a corresponding location identifier are stored in the second secondary marking register 1120. Processor circuit 18 also looks up adjacent locations associated with symbols 1215 and 1225, for example, on either side of symbol 1220, and stores these locations (and their corresponding location identifiers) in registers 1110 and 1130, respectively (step 1355). The relative location of rod 10 stored in register 5 is reinitialized in step 1360, and in step 1365, the image data stored in second image register 26 is loaded into first image register 19. Steps 1315-1330 are then repeated.

If a determination is made that registers 1110, 1120, and 1130 do not store all zero values (step 1340), the location identifier associated with a recognized symbol (e.g. symbol 1225, assuming that rod 10 has moved so that viewing range 315 is over portion 1210-3 covering symbol 1225 in FIG. 12) is compared to the identifiers stored in registers 1110, 1120, and 1130. One of the first, second and third locations having the matching identifier is then selected (step 1345). In this case, the identifier associated with symbol 1225 will match the identifier stored in third secondary marking register 1130. Thus, processor circuit 18 can identify the position of rod 10 as corresponding to the location of symbol 1225 by readily associating the matching identifier with the corresponding rod location.

It is noted that the three locations stored in registers 1110, 1120, and 1130 are typically the only three symbol locations that rod 10 could move to. Accordingly, by storing these locations and corresponding identifiers in registers 1110, 1120, and 1130, processor circuit 18 need not compare a sensed identifier to all possible identifiers to determine the corresponding symbol location.

Next, the sum of the first location (e.g., the location of symbol 1220) plus the calculated position stored in relative location register 5 is subtracted from the selected location in step 1345 (e.g., the location of symbol 1225) to obtain the error (step 1350). At this point, secondary marking register 1120 stores the current symbol location (i.e., the location of symbol 1225) as well as the locations of symbols on either side of symbol 1225 in registers 1110 and 1130, respectively (step 1355). In addition, the relative location register 5 is reinitialized (step 1360) to eliminate this error, and the most recent image data from the first sensor 16 is shifted into the first image register 19 (step 1365). The above process is then repeated starting at step 1315.

Figure 10:
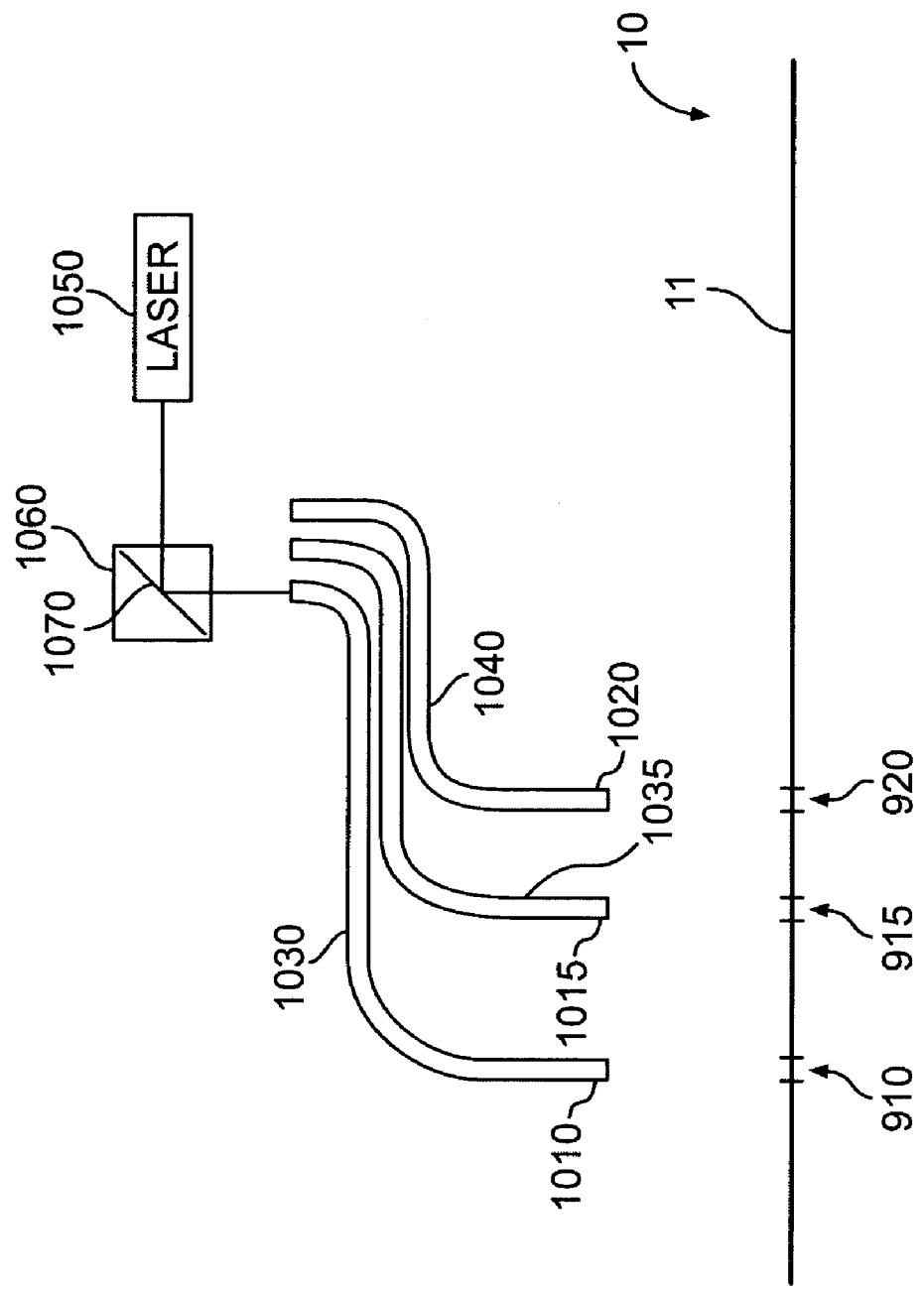
FIG. 10 illustrates an alternative apparatus for generating markings on a rod in accordance with a further aspect of the present disclosure.

FIGS. 9 and 10 illustrate apparatuses for generating markings 12, for example, on surface 11 of rod 10. As shown in FIG. 9, a plurality of light sources such as high intensity lasers 930, 935 and 940, are provided in housing 970. Housing 970 is configured to maintain each of lasers 930, 935 and 940 a uniform distance from surface 11. Accordingly, each of corresponding regions 910, 915 and 920, where markings 12 are formed, receives light at substantially same light intensity. Moreover, each of lasers 930, 935 and 940 can be activated at substantially the same time to simultaneously expose surface 11 so that each of markings 12 formed by such exposure has substantially the same length, width, and reflectivity.

Optionally, mirrors 982, 986, and 990 may be provided to direct light (represented by lines 992, 994, and 996, respectively) output from corresponding lasers 930, 935, and 940 to surface 11. Actuators 980, 984, and 988 may be operatively coupled to mirrors 982, 986, and 990 to change the position of mirrors 982, 986, and 990, and thus adjust the locations of corresponding regions 910, 915, and 920 exposed by the laser light allowing multiple marks to be made in the same general area. For example the marks the comprise 710-2 and 12-2 could each be made with one laser using this method.

As shown in FIG. 10, regions 910, 915 and 920 can also be exposed by light emanating from a corresponding one of end portions 1010, 1015 and 1020 of respective waveguides 1030, 1035 and 1040. Each of end portions 1010, 1015 and 1020 are spaced a uniform distance away from surface 11, and each of waveguides 1030, 1035 and 1040 can include either a light pipe or optical fiber, for example, to pass light from laser 1050 to surface 11. The light is selectively supplied to each of waveguides 1030, 1035 and 1040 by an optical switch 1060. Optical switch 1060 includes a mirror 1070, which can pivot to direct light to one of waveguides 1030, 1035 and 1020, as desired. Mirrors 982, 986, and 990, as well as corresponding actuators 980, 984, and 988 may also be provided in the embodiment shown in FIG. 10 in order to adjust the location of regions 910, 915, and 920 in a manner similar to that described above. In that case, mirrors 982, 986, and 990 would be associated with and provided adjacent respective end portions 1010, 1015, and 1020 of waveguides 1030, 1035, and 1040 to direct light to corresponding exposed regions 910, 915, and 920. In this example also, actuators 980, 984, and 988 can control or change a position of mirrors 982, 986, and 990, respectively, thereby adjusting the positions of regions 910, 915, and 920 in surface 11.

INDUSTRIAL APPLICABILITY

Consistent with the present disclosure, a hybrid position sensing system is provided for calculating a relative position of a movable member, such as a rod, based on images of surface roughness or irregularities. The system also incorporates a series of reference markings on the rod, which are sensed with a sensor circuit and used as reference locations to eliminate accumulated error in the calculated relative rod position. The markings may be uniformly spaced, or the distances between each may be closer to one another in certain regions of the rod surface to further minimize error where greater precision is required. If non-uniformly spaced markings are provided, additional or secondary markings may be required to specify the distances between such non-uniformly spaced markings. In that case, another sensor circuit may be provided in order to detect the additional markings. Alternatively, unique, non-uniformly spaced markings or symbols may be provided and sensed with a single sensor circuit.

The system may be deployed in vehicles, such as earth moving machines, construction equipment or other industrial machinery. In one example, the system consistent with the present disclosure may be provided to synchronize two "circuits" of a wheel loader. One such circuit includes a first rod for lifting a bucket, and the second circuit includes a second rod for tilting the bucket. Often when lifting the bucket, the bucket tends to rotate. With the system discussed above, however, the relative positions of the first and second rods can be accurately determined and synchronized with one another. As a result, bucket tilt can be offset by appropriate actuation of the second rod in response to movement of the first rod.

In an additional example, the system in accordance with the disclosure may be incorporated into a telehandler, which lifts material such as paleted material using forks rotationally attached to a telescoping boom. The boom can be raised to an angle in accordance with hydraulic actuation of a rod in one cylinder while the rotation of the forks is controlled by the hydraulic actulation of a rod in a second cylinder. By accurately determining the relative position of the rods in such equipment, the forks can be kept level as the boom angle is changed to lift the material above the ground.

Advantageously, the present disclosure avoids providing a complex barcode over the entire length of a rod. Rather, barcodes may be provided only near selected reference markings, or may be eliminated entirely. Further consistent with the present disclosure, multiple markings can be simultaneously formed on the rod surface, or may be sequentially formed by selectively supplying regions of the rod surface with laser light using an optical switch. This avoids the need for long precision linear displacement devices to move the marking device relative to the rod.

Other embodiments of the disclosure will be apparent to those skilled in the art from consideration of the specification and practice of the disclosure herein. It is intended that the specification and examples be considered as exemplary only, with a true scope and spirit of the disclosure being indicated by the following claims.

What is claimed is:

1. A method of locating a position of a movable member, the movable member being movable along a path and having a surface, the movable member including a plurality of markings provided on the surface, the method comprising:
   sensing first and second images of the surface of the movable member, the first and second images corresponding to first and second portions, respectively, of the surface of the movable member;
   calculating a position of the movable member based on the first and second images;
   determining whether the movable member is at a location corresponding to one of the plurality of markings; and
   eliminating an error associated with the position when the movable member is at the location corresponding to the one of the plurality of markings,
   wherein the first and second images include an image of a roughness of the first and second portions, respectively, of the surface of the movable member.

2. A method in accordance with claim 1, further including calculating additional positions of the movable member, wherein the error includes a cumulative error associated with the position and the additional positions.

3. A method in accordance with claim 1, wherein the determining includes sensing a level of intensity of light reflected from the surface of the movable member.

4. A method in accordance with claim 3, wherein the determining further includes determining whether the level of intensity of light reflected from the surface of the movable member is at a minimum value relative to other portions of the surface of the movable member.

5. A method in accordance with claim 3, wherein the determining further includes determining whether the level of intensity of light reflected from the surface of the movable member is at a maximum value relative to other positions of the surface of the movable member.

6. A method in accordance with claim 1, wherein the eliminating includes calculating a distance value between the location corresponding to one of the plurality of markings and the calculated position of the movable member.

7. A method in accordance with claim 1, further including initializing the calculated position of the movable member to a predetermined value.

8. A method of locating a position of a movable member, the movable member being movable along a path and having a surface, the movable member including a first and second plurality of markings provided on the surface, the method comprising:
   sensing first and second images of the surface of the movable member, the first and second images corresponding to first and second portions, respectively, of the surface of the movable member;
   calculating a position of the movable member based on the first and second images;
   determining whether the movable member is at a location corresponding to one of the first plurality of markings;
   eliminating an error associated with the position when the movable member is at the location corresponding to the one of the first plurality of markings; and
   wherein the second portion includes a second plurality of markings, each of the second plurality of markings having a width less than a width of each of the first plurality of markings.

9. A method in accordance with claim 8, wherein the location is a first location, and the one of the first plurality of markings is a first one of the first plurality of markings, the method further including:
   identifying a second location associated with a second one of the first plurality of markings in response to the second image; and
   identifying a third location associated with a third one of the first plurality of markings in response to the second image.

10. A method in accordance with claim 9, wherein the one of the of the second plurality of markings is a first one of the second plurality of markings, the method further including:
    sensing a second one of the second plurality of markings; and
    selecting one of the first, second and third locations based on the sensed second one of the second plurality of markings.

11. A method in accordance with claim 10, further including determining the error by subtracting a sum of the first location and a further calculated position from the selected one of the first, second, and third locations.

12. A method in accordance with claim 11, further including eliminating an error associated with the calculated further position.

13. A method of locating a position of a movable member, the movable member being movable along a path and having a surface, the movable member including a plurality of markings provided on the surface, the method comprising:

sensing first and second images of the surface of the movable member, the first and second images corresponding to first and second portions, respectively, of the surface of the movable member;

calculating a position of the movable member based on the first and second images;

determining whether the movable member is at a first location corresponding to a first one of the plurality of markings;

eliminating an error associated with the position when the movable member is at the first location corresponding to the first one of the plurality of markings;

identifying a second location associated with a second one of the plurality of markings;

identifying a third location associated with a third one of the plurality of markings; and selecting one of the first, second, and third locations in response to an image of a part of the surface of the movable member, the part of the surface including one of the first, second and third ones of the plurality of markings.

14. A method of locating a position of a movable member, the movable member being movable along a path and having a surface, the movable member including a plurality of markings provided on the surface, the method comprising:

sensing first and second images of the surface of the movable member, the first and second images corresponding to first and second portions, respectively, of the surface of the movable member;

calculating a position of the movable member based on the first and second images;

determining whether the movable member is at a location corresponding to one of the plurality of markings; and eliminating an error associated with the position when the movable member is at the location corresponding to the one of the plurality of markings;

wherein the first and second portions of the surface are located between adjacent ones of the plurality of markings.

* * * * *